United States Patent
Seung et al.

(10) Patent No.: US 11,628,747 B2
(45) Date of Patent: Apr. 18, 2023

(54) APPARATUS FOR CONTROLLING FUEL CELL OF ENVIRONMENT-FRIENDLY VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Sae Byeok Seung, Yongin-si (KR); Seung Yoon Lee, Seoul (KR); Jeong Kyu Park, Yongin-si (KR); Sang Chul Yeom, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 390 days.

(21) Appl. No.: 16/901,463

(22) Filed: Jun. 15, 2020

(65) Prior Publication Data
US 2021/0170909 A1 Jun. 10, 2021

(30) Foreign Application Priority Data
Dec. 10, 2019 (KR) .................. 10-2019-0164181

(51) Int. Cl.
*H01M 8/04537* (2016.01)
*B60L 58/30* (2019.01)
(Continued)

(52) U.S. Cl.
CPC .......... *B60L 58/30* (2019.02); *H01M 8/0438* (2013.01); *H01M 8/04611* (2013.01);
(Continued)

(58) Field of Classification Search
CPC ............ B60L 2240/12; B60L 2240/14; B60L 2240/549; B60L 2240/64; B60L 2240/66; B60L 2260/24; B60L 58/13; B60L 58/30; B60L 58/40; B60L 7/18; H01M 10/425; H01M 10/44; H01M 10/48; H01M 16/006; H01M 2010/4271; H01M 2220/20; H01M 2250/20; H01M 8/04313; H01M 8/0438; H01M 8/04611; H01M 8/04619; H01M 8/04626; H01M 8/04932; H01M 8/0494; H01M 8/04947; Y02E 60/10; Y02E 60/50; Y02T 10/70; Y02T 10/72; Y02T 90/16; Y02T 90/40
See application file for complete search history.

(56) References Cited

U.S. PATENT DOCUMENTS

2012/0296505 A1* 11/2012 Igarashi ............ H01M 8/04947 701/22
2016/0368590 A1* 12/2016 Karem .................... H02S 20/30

* cited by examiner

*Primary Examiner* — Victoria H Lynch
(74) *Attorney, Agent, or Firm* — McDonnell Boehnen Hulbert & Berghoff LLP (57) ABSTRACT

An apparatus for controlling a fuel cell of an environment-friendly vehicle, a system including the same, and a method thereof are provided. The apparatus includes a storage storing information mapping an amount of additional output of a fuel cell according to air density and a current battery state of a high voltage battery depending on a drive mode and a processor that controls an amount of output of the fuel cell in response to a required amount of output of a motor, the amount of output of the fuel cell being varied according to the air density, the current battery state, and the drive mode based on the information mapping the amount of additional output.

20 Claims, 9 Drawing Sheets

(51) Int. Cl.
*H01M 8/0438* (2016.01)
*H01M 8/04858* (2016.01)
*H01M 10/44* (2006.01)
*H01M 10/48* (2006.01)
*H01M 10/42* (2006.01)
*H01M 16/00* (2006.01)

(52) U.S. Cl.
CPC ... *H01M 8/04626* (2013.01); *H01M 8/04932* (2013.01); *H01M 8/04947* (2013.01); *H01M 10/425* (2013.01); *H01M 10/44* (2013.01); *H01M 10/48* (2013.01); *H01M 16/006* (2013.01); *B60L 2240/12* (2013.01); *B60L 2240/14* (2013.01); *B60L 2240/549* (2013.01); *B60L 2240/66* (2013.01); *H01M 2010/4271* (2013.01); *H01M 2220/20* (2013.01); *H01M 2250/20* (2013.01)

APPARATUS FOR CONTROLLING FUEL CELL OF ENVIRONMENT-FRIENDLY VEHICLE, SYSTEM INCLUDING THE SAME, AND METHOD THEREOF

CROSS REFERENCE TO RELATED APPLICATIONS

This application is claims the benefit of priority to Korean Patent Application No. 10-2019-0164181, filed in the Korean Intellectual Property Office on Dec. 10, 2019, the entire contents of which are incorporated herein by reference.

TECHNICAL FIELD

The present disclosure relates to an apparatus for controlling a fuel cell of an environment-friendly vehicle, a system including the same, and a method thereof, and more particularly, relates to technologies of varying an amount of output of a fuel cell.

BACKGROUND

A hybrid vehicle among environment-friendly vehicles refers to being driven by efficiently combining two or more different types of power sources. In most cases, the hybrid vehicle refers to a vehicle driven by an engine which burns fuels (fossil fuels such as gasoline) to obtain rotary power and an electric motor which obtains rotary power using battery power. This is commonly called a hybrid electric vehicle (HEV).

Such a hybrid vehicle is a future vehicle capable of adopting an electric motor as an auxiliary power source as well as an engine to promote an increase in fuel efficiency and a decrease in exhaust gas. Research has been actively conducted in the hybrid vehicle in response to the needs of the times where fuel efficiency should be improved and when environment-friendly produces should be developed.

The hybrid vehicle drives in a drive mode, such as an electric vehicle (EV) mode which is a pure electric vehicle mode using only power of an electric motor (driving motor), a hybrid electric vehicle (HEV) mode for using rotary power of the driving motor as an auxiliary power source while using rotary power of an engine as a main power source, or a regenerative braking (RB) mode for recovering braking of the vehicle or braking upon coastdown and inertial energy through and generation of the driving motor to charge the battery.

Although such an environment-friendly vehicle adjusts a maximum output (current) of a fuel cell downward in response to air density which is varied as an altitude (atmospheric pressure) is changed while driving, because the required amount of output of a motor is kept identical, usage of the battery may be increased by the amount of decrease of the maximum output of the fuel cell to correspond to the required amount of output of the motor.

In other words, because a speed at which a state of charge (SOC) of the battery is consumed when the vehicle is traveling on a road with a high altitude is faster than that when the vehicle is traveling on a road with a low altitude, that is, in a normal situation, it is difficult to maintain a targeted SOC. An increase in driving area due to a situation where the battery is insufficient leads to deterioration in driving stability.

SUMMARY

The present disclosure has been made to solve the above-mentioned problems occurring in the prior art while advantages achieved by the prior art are maintained intact.

An aspect of the present disclosure provides an apparatus for controlling a fuel cell of an environment-friendly vehicle to vary an amount of additional output of the fuel cell depending on one of air density, an altitude, or atmospheric pressure and a current state of charge (SOC) and stably maintain a target SOC to minimize a situation where a battery is insufficient and prevent driving stability from being degraded, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a fuel cell of an environment-friendly vehicle may include a storage storing information mapping an amount of additional output of a fuel cell according to air density and a current battery state of a high voltage battery depending on a drive mode and a processor that controls an amount of output of the fuel cell in response to a required amount of output of a motor, the amount of output of the fuel cell being varied according to the air density, the current battery state, and the drive mode based on the information mapping the amount of additional output of the fuel cell.

In an embodiment, the processor may determine the air density using a current altitude or atmospheric pressure of a vehicle.

In an embodiment, the processor may determine the drive mode based on vehicle speed information, accelerator information, and brake information.

In an embodiment, the processor may determine the drive mode, when the altitude or the atmospheric pressure is greater than a predetermined threshold.

In an embodiment, the processor may vary a target state of charge (SOC) depending on the altitude or the atmospheric pressure.

In an embodiment, the processor may vary the required amount of output of the motor using the amount of output of the fuel cell and an amount of discharge of the high voltage battery when the required amount of output of the motor is greater than or equal to a predetermined motor threshold, when the air density is less than a predetermined threshold and when the drive mode is an accelerating mode.

In an embodiment, the processor may increase the amount of output of the fuel cell to charge the high voltage battery when the required amount of output of the motor is less than a predetermined motor threshold, when the air density is less than a predetermined threshold and when the drive mode is an accelerating mode.

In an embodiment, the processor may determine the amount of output of the fuel cell by adding the amount of additional output of the fuel cell for charging the high voltage battery to the required amount of output of the motor, when the required amount of output of the motor is less than the predetermined motor threshold.

In an embodiment, the processor may determine the amount of additional output of the fuel cell in the accelerating mode depending on at least one of the air density, an altitude, or atmospheric pressure and a current SOC, based on the information mapping the amount of additional output of the fuel cell.

In an embodiment, the processor may increase the amount of output of the fuel cell to charge the high voltage battery, when the air density is less than a predetermined threshold and when the drive mode is an idle mode.

In an embodiment, the processor may increase the amount of output of the fuel cell by adding the amount of additional output of the fuel cell for charging the high voltage battery in the idle mode to a current SOC.

In an embodiment, the processor may determine the amount of additional output of the fuel cell in the idle ode depending on at least one of the air density, an altitude, or atmospheric pressure and a current SOC, based on the information mapping the amount of additional output of the fuel cell.

In an embodiment, the processor may increase the amount of output of the fuel cell to charge the high voltage battery when a current SOC is less than a predetermined battery threshold, when the air density is less than a predetermined threshold and when the drive mode is a coast regeneration mode.

In an embodiment, the processor may determine the amount of additional output of the fuel cell in the coast regeneration mode depending on at least one of the air density, an altitude, or atmospheric pressure and a current SOC, based on the information mapping the amount of additional output of the fuel cell.

In an embodiment, the processor may determine the amount of additional output of the fuel cell in the coast regeneration mode as the amount of output of the fuel cell.

In an embodiment, the processor may stop operating the fuel cell when the current SOC is less than the predetermined battery threshold, when the air density is less than the predetermined threshold and when the drive mode is the coast regeneration mode.

According to another aspect of the present disclosure, a system of an environment-friendly vehicle may include a sensing device that senses at least one of air density, an altitude, or atmospheric pressure and a fuel cell controller that controls an amount of output of a fuel cell in response to a required amount of output of a motor, the amount of output of the fuel cell being varied according to one of the air density, the altitude, or the atmospheric pressure, a current battery state of a high voltage battery, and a drive mode.

According to another aspect of the present disclosure, a method for controlling a fuel cell of an environment-friendly vehicle may include sensing at least one of air density, an altitude, or atmospheric pressure and controlling an amount of output of a fuel cell in response to a required amount of output of a motor, the amount of output of the fuel cell being varied according to one of the air density, the altitude, or the atmospheric pressure, a current battery state of a high voltage battery, and a drive mode.

In an embodiment, the varying of the amount of output of the fuel cell may include increasing the amount of output of the fuel cell to charge the high voltage battery when the required amount of output of the motor is less than a predetermined motor threshold, when the air density is less than a predetermined air density threshold or when the altitude or the atmospheric pressure is greater than a predetermined altitude threshold or a predetermined atmospheric pressure threshold and when the drive mode is an accelerating mode.

In an embodiment, the varying of the amount of output of the fuel cell may include increasing the amount of output of the fuel cell to charge the high voltage battery, when the air density is less than a predetermined air density threshold or when the altitude or the atmospheric pressure is greater than a predetermined altitude threshold or a predetermined atmospheric pressure threshold and when the drive mode is an idle mode.

In an embodiment, the varying of the amount of output of the fuel cell may include increasing the amount of output of the fuel cell to charge the high voltage battery when a current SOC is less than a predetermined battery threshold, when the air density is less than a predetermined air density threshold or when the altitude or the atmospheric pressure is greater than a predetermined altitude threshold or a predetermined atmospheric pressure threshold and when the drive mode is a coast regeneration mode.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of embodiments of the present disclosure with reference to FIGS. 1 and 9.

Figure 1:
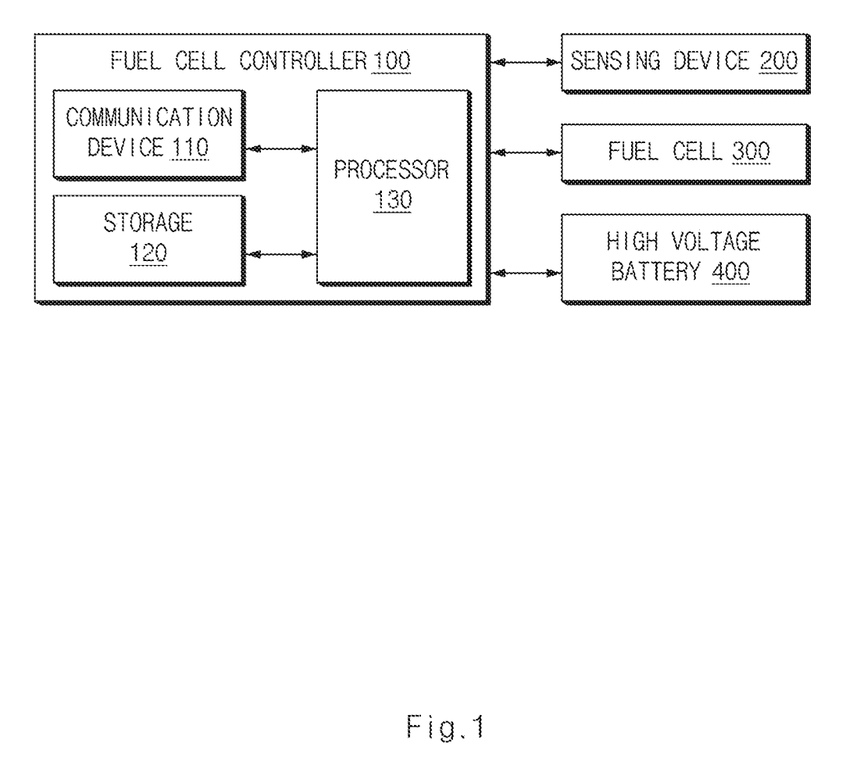
FIG. 1 is a block diagram illustrating a configuration of a vehicle system including an apparatus for controlling a fuel cell of an environment-friendly vehicle according to an embodiment of the present disclosure.

FIG. 1 is a block diagram illustrating a configuration of a vehicle system including an apparatus for controlling a fuel cell of an environment-friendly vehicle according to an embodiment of the present disclosure.

Referring to FIG. 1, the vehicle system according to an embodiment of the present disclosure may include a fuel cell controller 100, a sensing device 200, a fuel cell 300, and a high voltage battery 400.

The fuel cell controller 100 according to an embodiment of the present disclosure may be implemented in the vehicle. In this case, the fuel cell controller 100 may be integrally formed with control units in the vehicle, or may be implemented as a separate device to be connected with the control units of the vehicle by a separate connection means.

The fuel cell controller 100 may control an amount of output of the fuel cell 300 in response to a required amount of output of a motor, which may vary the amount of output of the fuel cell 300 depending on one of air density, an altitude, or atmospheric pressure, a current battery state (e.g., an SOC), and a drive mode.

In this case, the drive mode may be classified as an accelerating mode, an idle mode, or a coast regeneration mode.

The fuel cell controller 100 may determine the drive mode using vehicle speed information, accelerator information, and brake pedal information.

In other words, the accelerating mode may be a mode when a driver steps on an accelerator pedal in a state where the vehicle is traveling (in a state where there is a vehicle speed), which is a mode when the driver wants to accelerate. The idle mode may correspond to a mode when there is no vehicle speed and when the driver steps on a brake pedal. The coast regeneration mode may be a mode where the vehicle is traveling due to inertia in a state where there is a vehicle speed, but when the driver does step on the accelerator pedal and the brake pedal.

The fuel cell controller 100 may include a communication device 110, a storage 120, and a processor 130.

The communication device 110 may be a hardware device implemented with various electronic circuits to transmit and receive a signal with a device in the vehicle. In an embodiment of the present disclosure, the communication device 110 may implement a network communication technology in the vehicle. Herein, the network communication technology in the vehicle may be to perform inter-vehicle communication through controller area network (CAN) communication, local interconnect network (LIN) communication, flex-ray communication, or the like.

The storage 120 may store a sensing result of the sensing device 200 and may store data, algorithms, and/or the like necessary for an operation of the processor 130.

As an example, the storage 120 may store a lookup table mapping one of air density, an altitude, or atmospheric pressure for each drive mode and an amount of additional output of the fuel cell 300 according to an SOC. The storage 120 may store a motor threshold for determining a required output of a motor, a battery threshold for determining an SOC, which is determined in advance by an experimental value.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 130 may be electrically connected with the communication device 110, the storage 120, or the like and may electrically control the respective components. The processor 130 may be an electrical circuit which executes instructions of software and may perform a variety of data processing and calculation described below.

The processor 130 may process a signal delivered between respective components of the fuel cell controller 100. The processor 130 may be, for example, an electronic control unit (ECU), a micro controller unit (MCU), or another sub-controller, which is loaded into the vehicle.

The processor 130 may control an amount of output of the fuel cell 300 in response to a required amount of output of a motor, which may vary the amount of output of the fuel cell 300 depending on air density, a current battery state, and a drive mode based on the mapped information. In this case, the processor 130 may determine air density using a current altitude or current atmospheric pressure of the vehicle.

Furthermore, the processor 130 may determine a drive mode based on vehicle speed information, accelerator information, and brake information. Furthermore, when an altitude or atmospheric pressure is greater than a predetermined threshold, the processor 130 may determine a drive mode.

The processor 130 may vary a target state of charge (SOC) depending on an altitude or atmospheric pressure. In this case, when the altitude or atmospheric pressure becomes greater than the predetermined threshold, because it is able to increase usage of a battery, the processor 130 may increase a target SOC.

When the air density is less than a predetermined threshold, when the drive mode is an accelerating mode, and when the required amount of output of the motor is greater than or equal to a predetermined motor threshold, the processor 130 may vary the required amount of output of the motor using an amount of output of the fuel cell 300 and an amount of discharge of the high voltage battery 400.

On the other hand, when the air density is less than the predetermined threshold, when the drive mode is the accelerating mode, and when the required amount of output of the motor is less than the predetermined motor threshold, the processor 130 may increase an amount of output of the fuel cell 300 to charge the high voltage battery 400. As such, when the air density is less than a predetermined air density threshold or when the altitude or atmospheric pressure is greater than a predetermined altitude threshold or a predetermined atmospheric pressure threshold, and when the vehicle is traveling in the accelerating mode, the processor 130 may vary and determine an amount of additional output of the fuel cell 300 for charging the high voltage battery 400 depending on one of the air density, the altitude, or the atmospheric pressure and an SOC.

In other words, when the air density is less than the predetermined air density threshold or when the altitude or atmospheric pressure is greater than the predetermined altitude threshold or the predetermined atmospheric pressure threshold, and when the vehicle is traveling in the accelerating mode, the processor 130 may increase the amount of additional output of the fuel cell 300 to increase an amount of output of the fuel cell 300 and may charge the high voltage battery 400.

When the required amount of output of the motor is less than the predetermined motor threshold, the processor 130 may add the amount of additional output of the fuel cell 300 for charging the high voltage battery 400 to the required amount of output of the motor to determine the amount of output of the fuel cell 300. The processor 130 may determine an amount of additional output of the fuel cell 300 in the accelerating mode depending on at least one of air density, an altitude, or atmospheric pressure and a current SOC, based on the mapped information.

When the air density is less than the predetermined threshold and when the drive mode is an idle mode, the processor 130 may increase an amount of output of the fuel cell 300 to charge the high voltage battery 400. Furthermore, the processor 130 may add an amount of additional output of the fuel cell 300 for charging the high voltage battery 400 in the idle mode to a current SOC to increase an amount of output of the fuel cell 300. In other words, the processor 130 may determine an amount of additional output of the fuel cell 300 in the idle mode depending on at least one of air density, an altitude, or atmospheric pressure and a current SOC, based on the mapped information.

When the air density is less than the predetermined threshold, when the drive mode is a coast regeneration mode, and when the current SOC is less than a predetermined battery threshold, the processor 130 may increase an amount of output of the fuel cell 300 to charge the high voltage battery 400. In this case, the processor 130 may determine an amount of additional output of the fuel cell 300 in the coast regeneration mode depending on at least one of air density, an altitude, or atmospheric pressure and a current SOC, based on the mapped information. Furthermore, the processor 130 may determine the amount of additional output of the fuel cell 300 in the coast regeneration mode as an amount of output of the fuel cell 300.

When the air density is less than the predetermined threshold, when the drive mode is the coast regeneration mode, and when the current SOC is less than the predetermined battery threshold, the processor 130 may stop operating the fuel cell 300 to prevent battery abnormality from occurring because the high voltage battery 400 continues being charged although the amount of charge of the high voltage battery 400 is sufficient.

The sensing device 200 may sense a current altitude or atmospheric pressure of the vehicle and may include an atmospheric pressure sensor, an altitude sensor, and the like to sense it.

Figure 2:
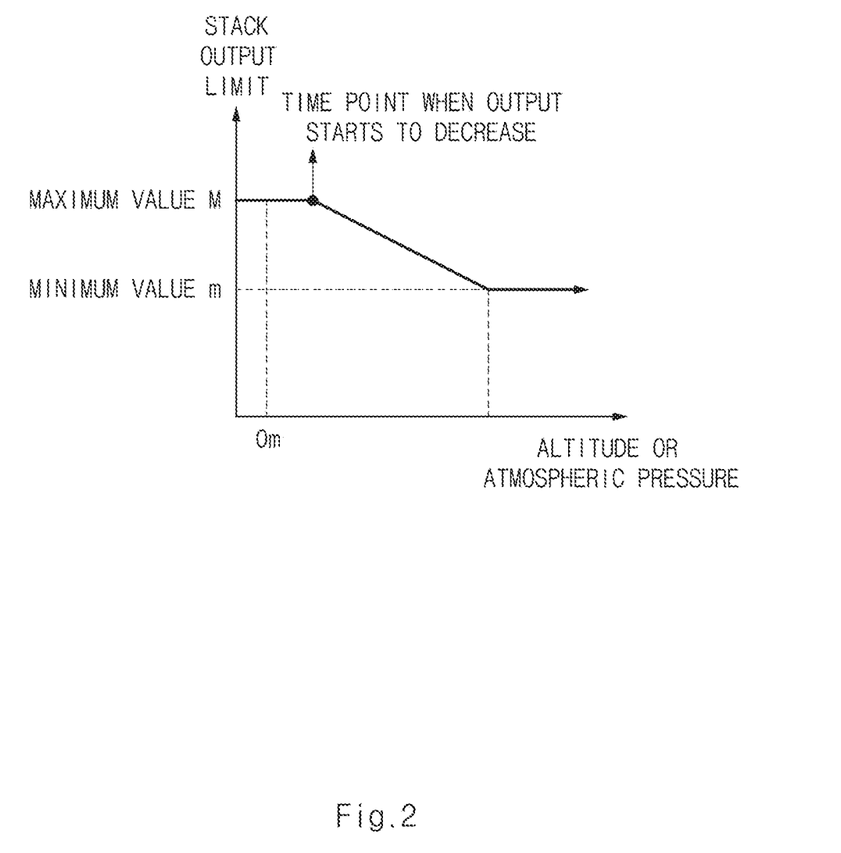
FIG. 2 is a graph illustrating a change in an output of a fuel cell according to an altitude, according to an embodiment of the present disclosure.

FIG. 2 is a graph illustrating a change in an output of a fuel cell according to an altitude according to an embodiment of the present disclosure.

Referring to FIG. 2, an altitude or atmospheric pressure may be determined within a range between maximum value M and minimum value m in the amount of output of a fuel cell. In this case, it may be seen that, when the altitude or atmospheric pressure becomes high, maximum value M in the amount of output of the fuel cell starts to decrease.

Figure 3A:
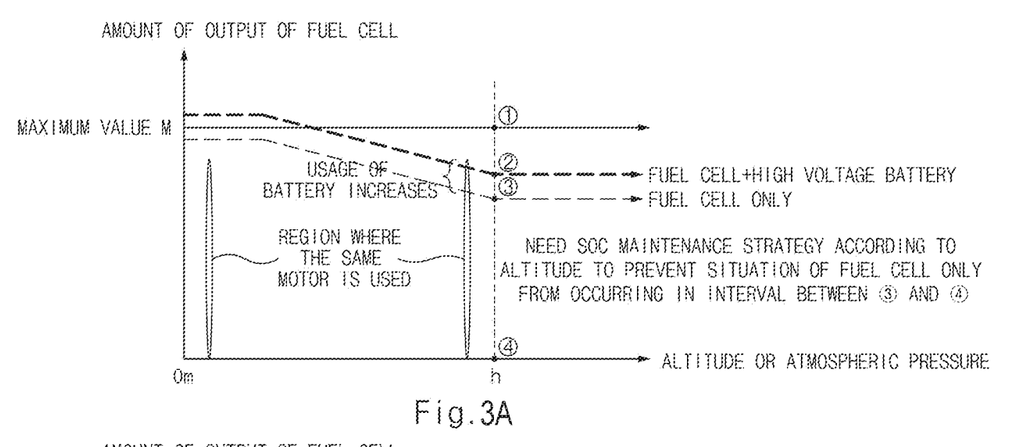
FIGS. 3A and 3B are drawings illustrating a required output of a motor according to an altitude, according to an embodiment of the present disclosure.
Figure 3B:
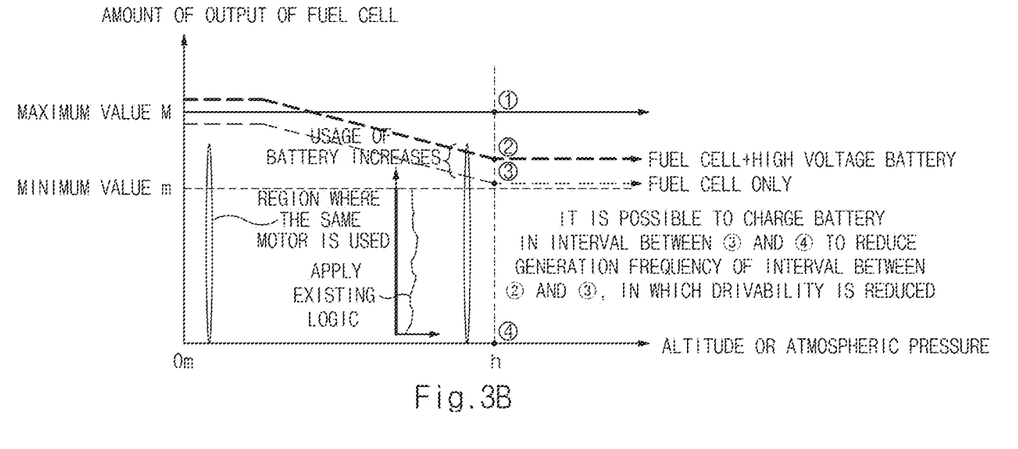

FIGS. 3A and 3B are drawings illustrating a required output of a motor according to an altitude, according to an embodiment of the present disclosure.

FIG. 3A denotes a required output of a motor according to a conventional logic. FIG. 3B denotes a required output of a motor according to an embodiment of the present disclosure.

Referring to FIG. 3A, when the required amount of output of the motor is within an interval A between ③ and ④, it is possible to travel using only a fuel cell, a high voltage battery is not charged, and a power source is sufficient.

When the required amount of output of the motor increases to an interval B between ② and ③, a limit output (maximum value) of the fuel cell should be used and the high voltage battery is discharged to help the amount of output of the fuel cell, such that a power source is sufficient.

When a situation C where the required amount of output of the motor is within the interval between ② and ③ continues, because an SOC becomes low, the amount of battery assist is degraded or it is impossible to assist the battery. Although the limit output of the fuel cell is used, the amount of battery assist is insufficient and the power source is insufficient.

Thereafter, when the required amount of output of the motor increases to an interval D between ① and ②, because the limit output of the fuel cell is used and because a limit output of the battery is used, the power source may be insufficient. In other words, because the required amount of output of the motor is greater than an available output of the fuel cell in the interval D, a voltage drop may occur and drivability may be degraded.

Like FIG. 3A, the conventional logic continues performing hill climbing or is traveling in a direction where an SOC of the battery is consumed in all the intervals A, B, and D in a condition where the vehicle is traveling on a highway. As the altitude becomes higher, because the interval A (a region between ③ and ④) becomes smaller, a frequency of consumption of the battery increases in the same driving situation. Thus, a frequency of entering the environment C may be increased.

On the other hand, referring to FIG. 3B, when the required amount of output of the motor is within an interval A between ③ and ④, it is possible to travel using only a fuel cell, but a high voltage battery is charged and a power source is sufficient. Thus, because an SOC is kept constant, a frequency of entering an interval B may be decreased.

In other words, an embodiment of the present disclosure may suppress generation frequency of an interval between ② and ③ where drivability is degraded due to an increase in the amount of charge in a coast regeneration mode and an idle mode by charging the high voltage battery in the interval A between ③ and ④.

Figure 4A:
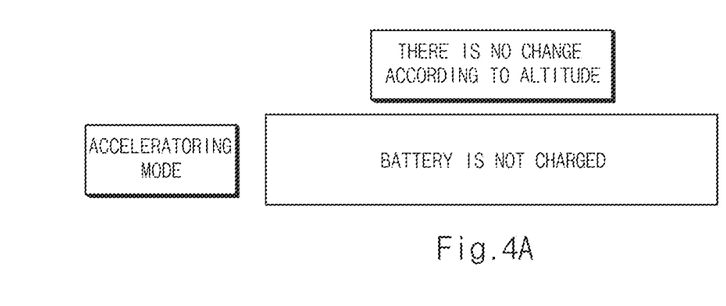
FIGS. 4A and 4B are drawings illustrating a battery charge strategy in an accelerating mode according to an embodiment of the present disclosure.
Figure 4B:
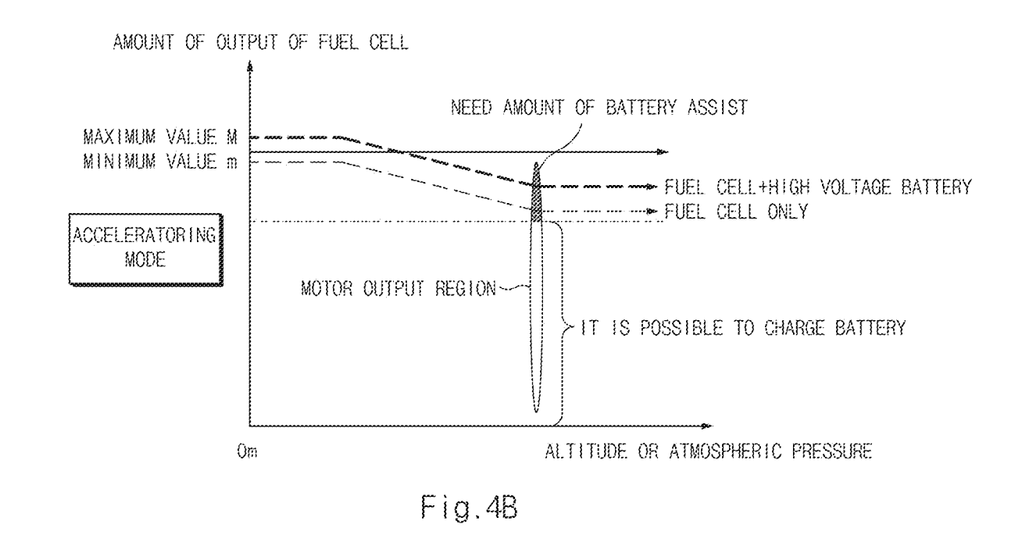

FIGS. 4A and 4B are drawings illustrating a battery charge strategy in an accelerating mode according to an embodiment of the present disclosure.

FIG. 4A indicates an existing logic which does not charge a high voltage battery depending on an altitude in an accelerating mode. FIG. 4B indicates an example of charging a high voltage battery depending on an altitude in the accelerating mode.

Referring to FIG. 4A, as the altitude becomes higher, a minimum value of the amount of output of a fuel cell may be more decreased. It is necessary to assist the high voltage battery. Thus, the high voltage battery may be charged to maintain an SOC.

Figure 5A:
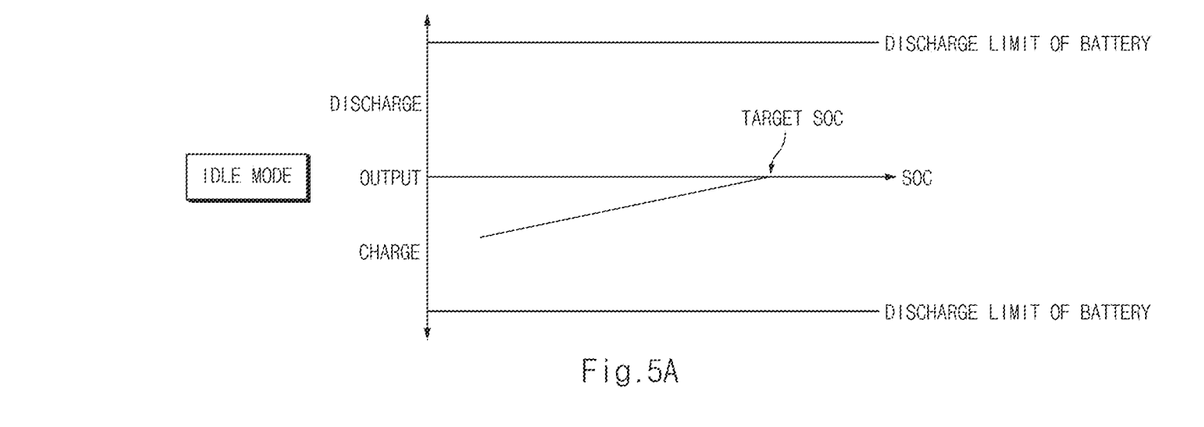
FIGS. 5A and 5B are drawings illustrating a battery charge strategy in an idle mode according to an embodiment of the present disclosure.
Figure 5B:
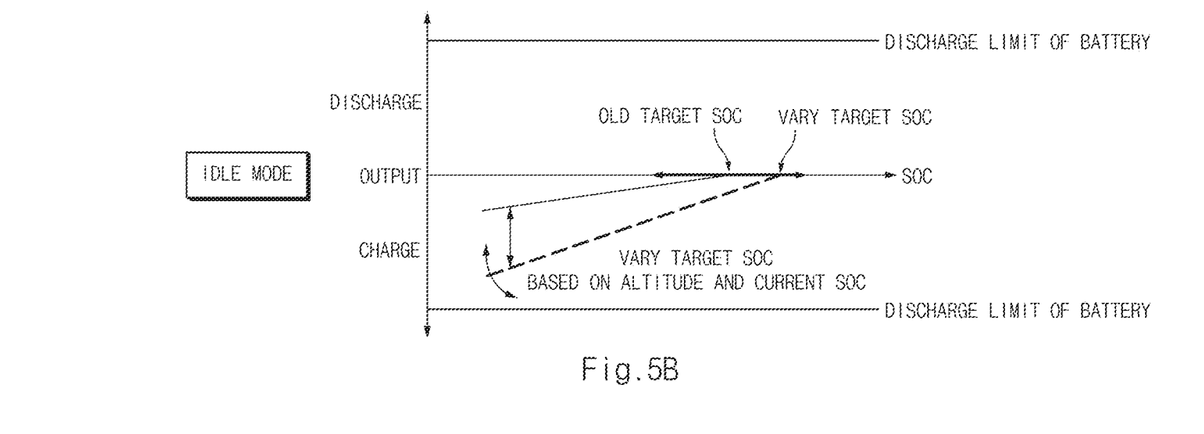

FIGS. 5A and 5B are drawings illustrating a battery charge strategy in an idle mode according to an embodiment of the present disclosure.

FIG. 5A indicates an existing SOC in an idle mode. FIG. 5B indicates an SOC in an idle mode according to an embodiment of the present disclosure.

Referring to FIG. 5B, a target SOC may be varied by an altitude and a current SOC in the idle mode.

Figure 6A:
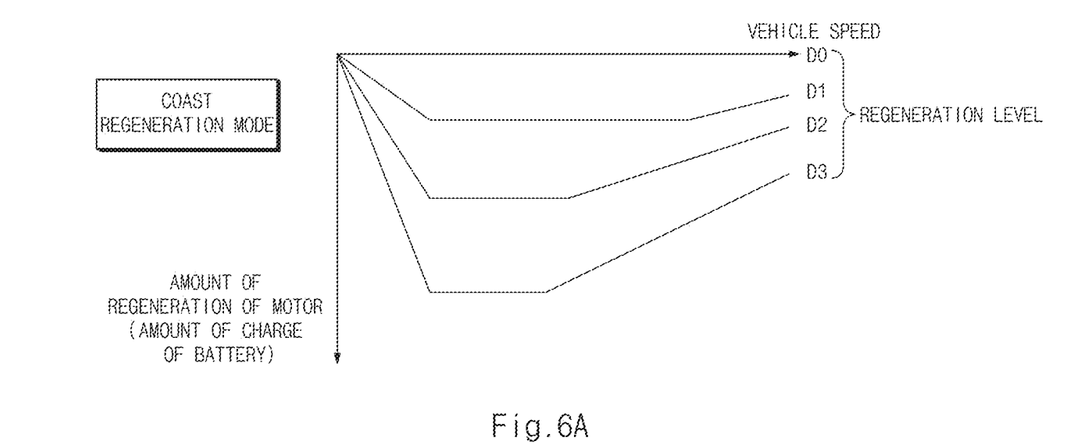
FIGS. 6A and 6B are drawings illustrating a battery charge strategy in a coast regeneration mode according to an embodiment of the present disclosure.
Figure 6B:
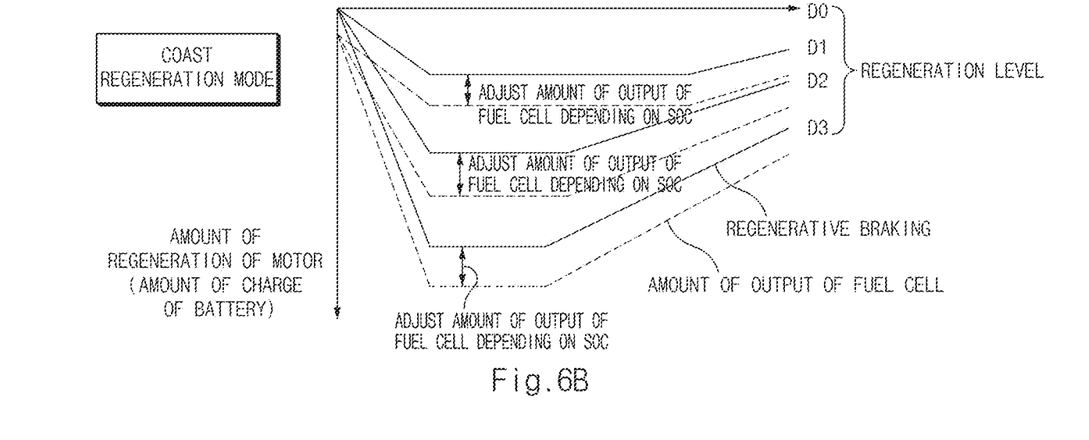

FIGS. 6A and 6B are drawings illustrating a battery charge strategy in a coast regeneration mode according to an embodiment of the present disclosure.

FIG. 6A indicates an existing change in the amount of charge in a coast regeneration mode. FIG. 6B indicates a change in the amount of charge in a coast regeneration mode according to an embodiment of the present disclosure.

Referring to FIG. 6B, an amount of output of a fuel cell may be adjusted according to an altitude and a current SOC.

Figure 7:
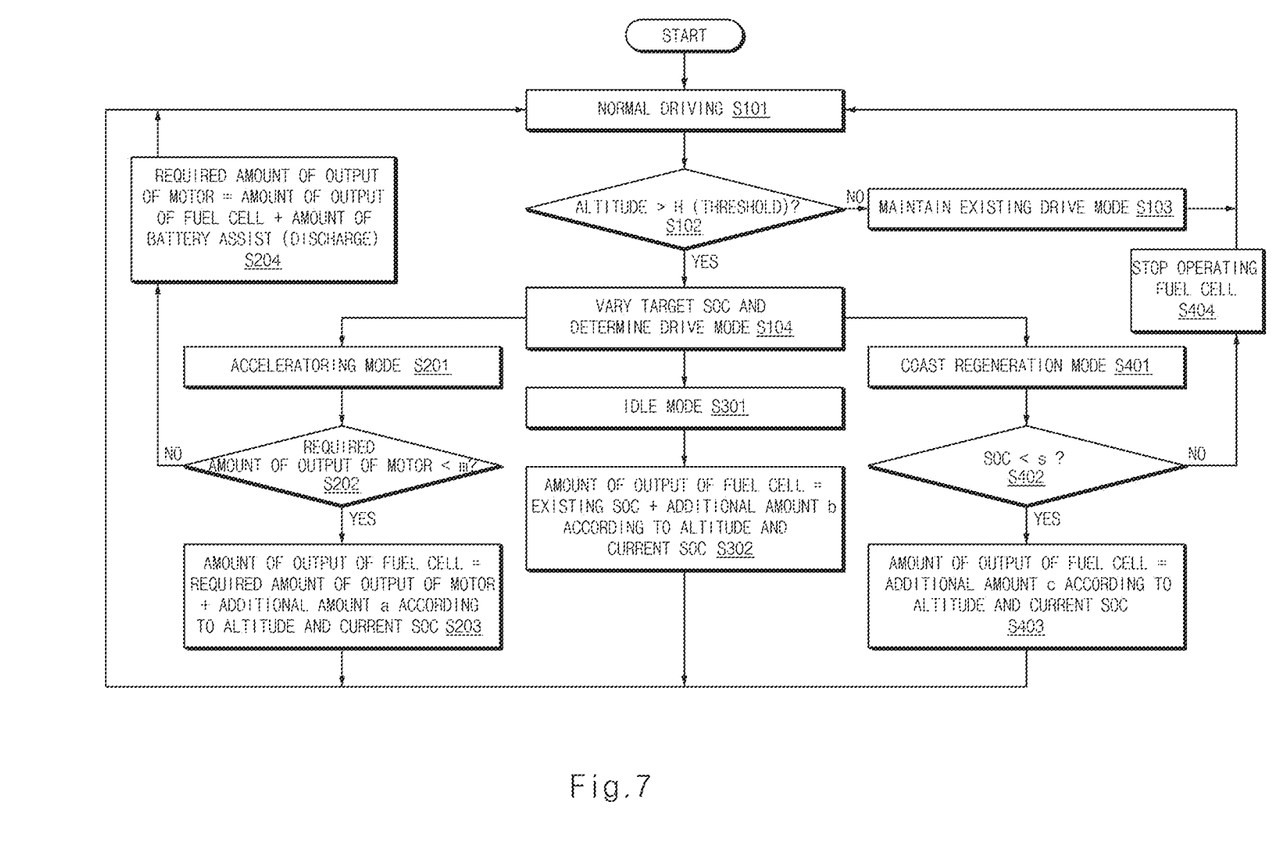
FIG. 7 is a flowchart illustrating a method for controlling a fuel cell of an environment-friendly vehicle according to an embodiment of the present disclosure.

Hereinafter, a description will be given in detail of a method for controlling a fuel cell of an environment-friendly vehicle according to an embodiment of the present disclosure with reference to FIG. 7. FIG. 7 is a flowchart illustrating a method for controlling a fuel cell of an environment-friendly vehicle according to an embodiment of the present disclosure.

Hereinafter, it is assumed that a fuel cell controller 100 of FIG. 1 performs a process of FIG. 7. Furthermore, in a description of FIG. 7, an operation described as being performed by an apparatus may be understood as being controlled by a processor 130 of the fuel cell controller 100.

Referring to FIG. 7, during normal driving in S101, in S102, the apparatus may determine whether an altitude of a road on which a vehicle is traveling is greater than a predetermined threshold. In this case, in FIG. 7, an embodiment is exemplified as the apparatus determines an altitude or atmospheric pressure of the road on which the vehicle is traveling using an atmospheric pressure sensor, an altitude sensor, map information, or the like and determines current air density. However, embodiments are not limited thereto. For example, the apparatus may apply various methods capable of determining current air density.

When the altitude of the road on which the vehicle is traveling is less than or equal to the predetermined threshold value, in S103, the apparatus may maintain an existing drive mode to continue driving the vehicle.

When the altitude of the road on which the vehicle is traveling is greater than the predetermined threshold value, in S104, the apparatus may determine a drive mode while varying a target SOC depending on the altitude. In this case, as the altitude becomes high, because there may be a high probability that a high voltage battery will be used, the apparatus may increase the target SOC. In other words, the apparatus may vary the target SOC according to the altitude based on a lookup table mapping an SOC in advance depending on the altitude or the atmospheric pressure.

In this case, the drive mode may be classified as an accelerating mode, an idle mode, or a coast regeneration mode. The apparatus may determine the drive mode using vehicle speed information, accelerator information, and brake pedal information.

In other words, the accelerating mode may be a mode when a driver steps on an accelerator pedal in a state where the vehicle is traveling (in a state where there is a vehicle speed), which is a mode when the driver wants to accelerate. The idle mode may correspond to a mode when there is no vehicle speed and when the driver steps on a brake pedal. The coast regeneration mode may be a mode where the vehicle is traveling due to inertia in a state where there is a vehicle speed, but when the driver does step on the accelerator pedal and the brake pedal.

The process below discloses a process of varying and controlling the amount of additional production of a fuel cell according to each drive mode.

First of all, when the drive mode is the accelerating mode in S201, in S202, the apparatus may determine whether a required amount of output of a motor is less than a predetermined reference value m.

When the required amount of output of the motor is less than the predetermined reference value m, in S203, the apparatus may calculate an amount of output of a fuel cell by adding the required amount of output of the motor to an additional amount a determined according to an altitude and a current SOC. In this case, when the altitude is high, the apparatus may calculate the additional amount a with regard to a maximum value of an output produced by the fuel cell. The additional amount a may correspond to an output for charging a high voltage battery. For example, assuming that a maximum value of the amount of output of the fuel cell is 100 and that the required amount of output of the motor is 70, the amount of output of the fuel cell may be set to 70 according to the required amount of output of the motor. Then, when the altitude becomes high, as the maximum value of the amount of output of the fuel cell decreases to 80 and as the required amount of output of the motor is maintained as 70 without change, the amount of output of the fuel cell may be set to 70. The amount of output of the fuel cell may be increased by the additional amount a (e.g., 10) for charging the high voltage battery to be output as 80. Thus, as the amount of output of the fuel cell becomes 80, 70 may be used to drive the motor and the remaining 10 may be used to charge the high voltage battery. In this case, as the additional amount a is varied according to the altitude and the current SOC, an amount of charge of the high voltage battery may be varied.

When the required amount of output of the motor is greater than or equal to the predetermined reference value m, in S204, the apparatus may adjust the required amount of output of the motor by adding the amount of output of the fuel cell to the amount of battery assist. In other words, the apparatus may output the amount of output of the fuel cell by the required amount of output of the motor and may increase an insufficient amount in the amount of output of the fuel cell by discharging the high voltage battery.

Meanwhile, when the drive mode is the idle mode in S301, in S302 the apparatus may determine an amount of output of the fuel cell by adding an existing SOC to an additional amount b according to the altitude and the current SOC. In other words, the apparatus may charge the high voltage battery by the additional amount b and may adjust an amount of charge of the high voltage battery by varying the additional amount b.

Meanwhile, when the drive mode is the coast regeneration mode in S401, in S402 the apparatus may determine whether the current SOC is less than a predetermined threshold s.

When the current SOC is less than the predetermined threshold s, in S403, the apparatus may determine an additional amount c according to the altitude and the current SOC as an amount of output of the fuel cell. In this case, the additional amount c may be an output for charging the high voltage battery. The apparatus may charge the high voltage battery by the additional amount c.

Meanwhile, when the current SOC is greater than or equal to the predetermined threshold s, in S404, the apparatus may stop operating the fuel cell. In other words, when the SOC value is already large, because a problem occurs in the high voltage battery when the high voltage battery continues being charged, the apparatus may stop operating the fuel cell to prevent a critical situation. In this case, the stopping operating the fuel cell may include pausing for starting or the like.

In this case, the additional amount a, b, or c for each drive mode may be stored in a lookup table mapped according to the altitude and the current SOC. Thus, when determining the amount of output of the fuel cell, the apparatus may use the additional amounts a, b, and c mapped according to the altitude and the current SOC for each drive mode.

Figure 8:
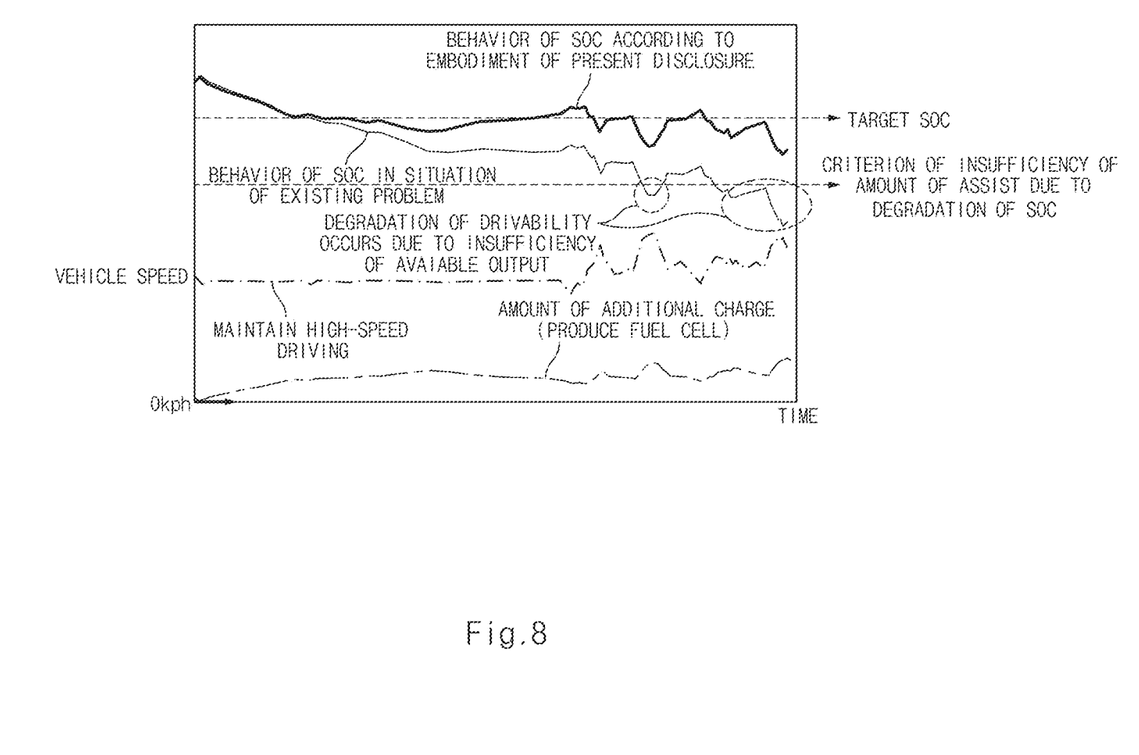
FIG. 8 is a graph illustrating a change in SOC according to an embodiment of the present disclosure.

FIG. 8 is a graph illustrating a change in SOC according to an embodiment of the present disclosure.

Referring to FIG. 8, when a fuel cell is controlled in an existing manner when a vehicle is traveling at a high speed on a road with a high altitude, an SOC may continue decreasing to decrease less than a minimum value. As the amount of battery assist is insufficient due to the degradation of the SOC, an available output is insufficient and drivability is reduced. Thus, as proposed in an embodiment of the present disclosure, when a vehicle is traveling at a high speed on a road with a high altitude, the amount of additional production of a fuel cell may be varied and controlled to additionally charge a high voltage battery, such that an SOC is stably maintained near a target SOC.

As such, because an output of the fuel cell is lowered in a situation where there is rarified air such as a road with a high altitude, when there is much battery consumption, an embodiment of the present disclosure may charge the battery by additionally producing an output of the fuel cell for each drive mode depending on the altitude and the SOC, thus improving the force of maintaining the SOC and suppressing the degradation of driving stability due to the insufficiency of an available output.

Figure 9:
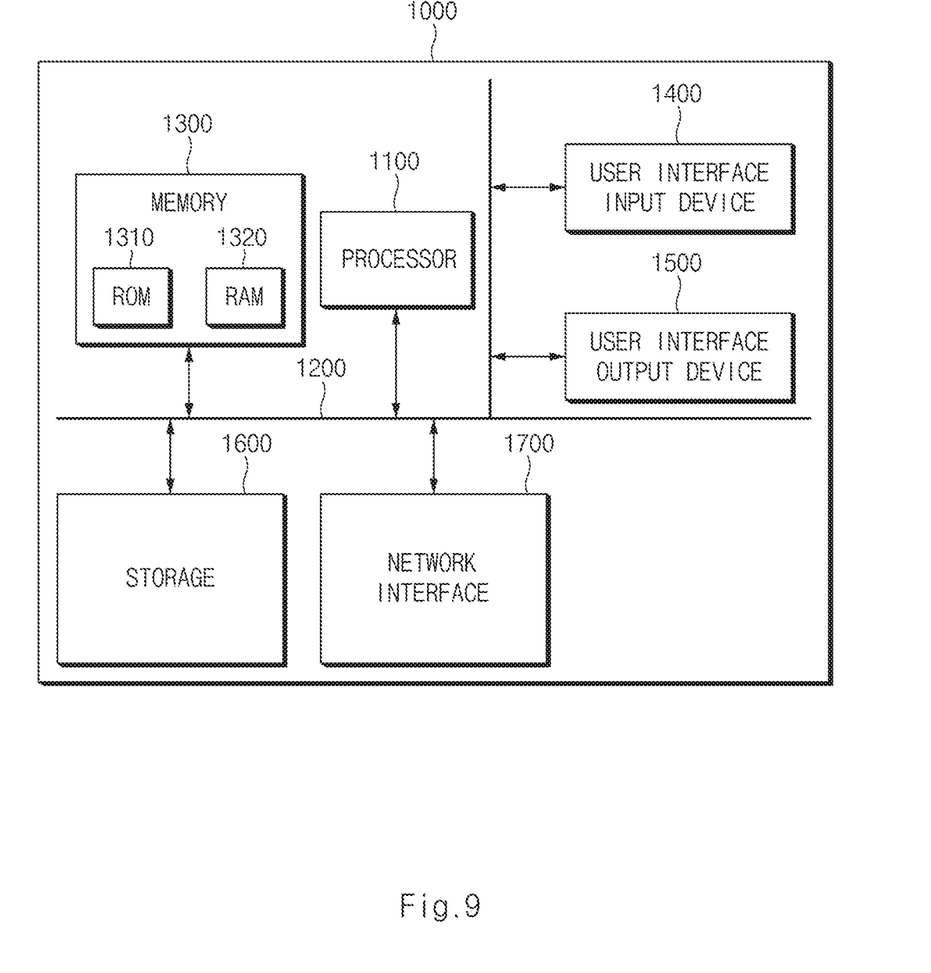
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may vary the amount of additional output of the fuel cell depending on one of air density, an altitude, or atmospheric pressure and a current SOC to stably maintain a target SOC, thus minimizing a situation where the battery is insufficient and preventing driving stability from being degraded.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for controlling a fuel cell of an environment-friendly vehicle, the apparatus comprising:
   a storage storing information mapping an amount of additional output of a fuel cell according to air density and a current battery state of a high voltage battery depending on a drive mode; and
   a processor configured to control an amount of output of the fuel cell in response to a required amount of output of a motor, the amount of output of the fuel cell being varied according to the air density, the current battery state, and the drive mode based on the information mapping the amount of additional output of the fuel cell
   wherein the drive mode includes an idle mode, a coast regeneration mode, and an accelerating mode.

2. The apparatus of claim 1, wherein the processor determines the air density using a current altitude or atmospheric pressure of a vehicle.

3. The apparatus of claim 1, wherein the processor determines the drive mode based on vehicle speed information, accelerator information, and brake information.

4. The apparatus of claim 2, wherein the processor determines the drive mode, when the altitude or the atmospheric pressure is greater than a predetermined threshold.

5. The apparatus of claim 2, wherein the processor varies a target state of charge (SOC) depending on the altitude or the atmospheric pressure.

6. The apparatus of claim 1, wherein the processor varies the required amount of output of the motor using the amount of output of the fuel cell and an amount of discharge of the high voltage battery when the required amount of output of the motor is greater than or equal to a predetermined motor threshold, when the air density is less than a predetermined threshold and when the drive mode is the accelerating mode.

7. The apparatus of claim 1, wherein the processor increases the amount of output of the fuel cell to charge the high voltage battery when the required amount of output of the motor is less than a predetermined motor threshold, when the air density is less than a predetermined threshold and when the drive mode is the accelerating mode.

8. The apparatus of claim 7, wherein the processor determines the amount of output of the fuel cell by adding the amount of additional output of the fuel cell for charging the high voltage battery to the required amount of output of the motor, when the required amount of output of the motor is less than the predetermined motor threshold.

9. The apparatus of claim 8, wherein the processor determines the amount of additional output of the fuel cell in the accelerating mode depending on at least one of the air density, an altitude, or atmospheric pressure and a current SOC, based on the information mapping the amount of additional output of the fuel cell.

10. The apparatus of claim 1, wherein the processor increases the amount of output of the fuel cell to charge the high voltage battery, when the air density is less than a predetermined threshold and when the drive mode is the idle mode.

11. The apparatus of claim 10, wherein the processor increases the amount of output of the fuel cell by adding the amount of additional output of the fuel cell for charging the high voltage battery in the idle mode to a current SOC.

12. The apparatus of claim 11, wherein the processor determines the amount of additional output of the fuel cell in the idle mode depending on at least one of the air density, an altitude, or atmospheric pressure and a current SOC, based on the information mapping the amount of additional output of the fuel cell.

13. The apparatus of claim 1, wherein the processor increases the amount of output of the fuel cell to charge the high voltage battery when a current SOC is less than a predetermined battery threshold, when the air density is less than a predetermined threshold and when the drive mode is the coast regeneration mode.

14. The apparatus of claim 13, wherein the processor determines the amount of additional output of the fuel cell in the coast regeneration mode depending on at least one of the air density, an altitude, or atmospheric pressure and a current SOC, based on the information mapping the amount of additional output of the fuel cell.

15. The apparatus of claim 13, wherein the processor determines the amount of additional output of the fuel cell in the coast regeneration mode as the amount of output of the fuel cell and stops operating the fuel cell when the current SOC is less than the predetermined battery threshold, when the air density is less than the predetermined threshold and when the drive mode is the coast regeneration mode.

16. A vehicle system, comprising:
 a sensing device configured to sense at least one of air density, an altitude, or atmospheric pressure; and
 a fuel cell controller configured to control an amount of output of a fuel cell in response to a required amount of output of a motor, the amount of output of the fuel cell being varied according to one of the air density, the altitude, or the atmospheric pressure, a current battery state of a high voltage battery, and a drive mode;
 wherein the drive mode incudes an idle mode, a coast regeneration mode, and an accelerating mode.

17. A method for controlling a fuel cell of an environment-friendly vehicle, the method comprising:
 sensing at least one of air density, an altitude, or atmospheric pressure; and
 controlling an amount of output of a fuel cell in response to a required amount of output of a motor, the amount of output of the fuel cell being varied according to one of the air density, the altitude, or the atmospheric pressure, a current battery state of a high voltage battery, and a drive mode;
 wherein the drive mode incudes an idle mode, a coast regeneration mode, and an accelerating mode.

18. The method of claim 17, wherein the varying of the amount of output of the fuel cell includes:
 increasing the amount of output of the fuel cell to charge the high voltage battery when the required amount of output of the motor is less than a predetermined motor threshold, when the air density is less than a predetermined air density threshold or when the altitude or the atmospheric pressure is greater than a predetermined altitude threshold or a predetermined atmospheric pressure threshold and when the drive mode is the accelerating mode.

19. The method of claim 17, wherein the varying of the amount of output of the fuel cell includes:
 increasing the amount of output of the fuel cell to charge the high voltage battery, when the air density is less than a predetermined air density threshold or when the altitude or the atmospheric pressure is greater than a predetermined altitude threshold or a predetermined atmospheric pressure threshold and when the drive mode is the idle mode.

20. The method of claim 17, wherein the varying of the amount of output of the fuel cell includes:
 increasing the amount of output of the fuel cell to charge the high voltage battery when a current SOC is less than a predetermined battery threshold, when the air density is less than a predetermined air density threshold or when the altitude or the atmospheric pressure is greater than a predetermined altitude threshold or a predetermined atmospheric pressure threshold and when the drive mode is the coast regeneration mode.

* * * * *